May 1, 1928.

E. L. SCHELLENS ET AL 1,668,424

RAILWAY TRUCK

Filed July 21, 1922

WITNESS
Gustav Genzlinger.

INVENTORS
J. S. Coffin, Jr
E. L. Schellens
BY
ATTORNEYS

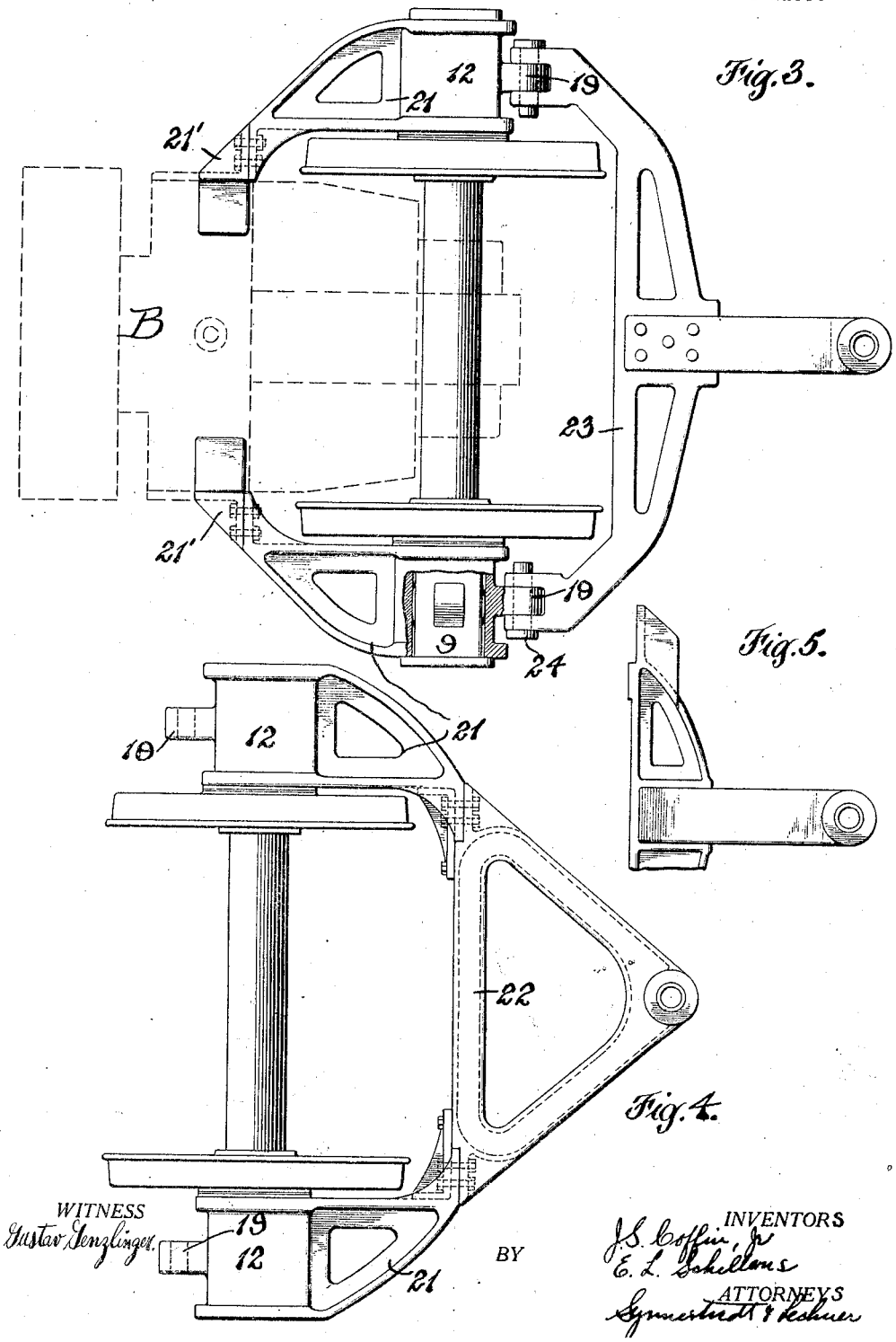

Patented May 1, 1928.

1,668,424

UNITED STATES PATENT OFFICE.

EUGENE L. SCHELLENS, OF POINTE CLAIRE, QUEBEC, CANADA, AND JOEL S. COFFIN, JR., OF LISBON, NEW HAMPSHIRE, ASSIGNORS, BY DIRECT AND MESNE ASSIGNMENTS, TO C-S ENGINEERING COMPANY, A CORPORATION OF DELAWARE.

RAILWAY TRUCK.

Application filed July 21, 1922. Serial No. 576,617.

This invention relates to trucks for railway vehicles and it is especially useful in radial trucks, such as the trailing truck of a locomotive.

It is one of the primary objects of our invention to provide an improved form of truck which is very light and economical in construction, and in which excessive weight on the drivers is avoided.

Another object of our invention is the provision of an improved open construction in which alignment difficulties and overheating of the bearings are overcome.

Still another object of our invention is the provision of an improved form of truck which may be used as a simple truck, or as a booster-driven truck, the construction being such that the truck is standard and capable of a very wide range of application either as a simple truck or booster-driven truck, the truck being thus interchangeable with other simple trucks or with the truck proper of a booster-driven truck.

Our invention also contemplates an arrangement of the characteristics described which makes it possible to apply boosters where heretofore such application has been impossible because of space limitations.

For other advantages of our invention reference is made to our copending application Serial No. 576,616, filed July 21, 1922.

The foregoing, together with such other objects as may hereinafter appear, or are incident to our invention, we obtain by means of a construction, the preferred embodiments of which we have illustrated in the accompanying drawings, wherein:

Fig. 3 is a view corresponding to Fig. 1, illustrating what may be termed a reverse or inverted arrangement of our invention;

Fig. 4 is a plan view illustrating one way in which the truck of Fig. 3 may be used as a simple truck; and Fig. 5 is a fragmentary plan view illustrating another way whereby the truck of Fig. 3 may be used as a simple truck.

Figure 1:
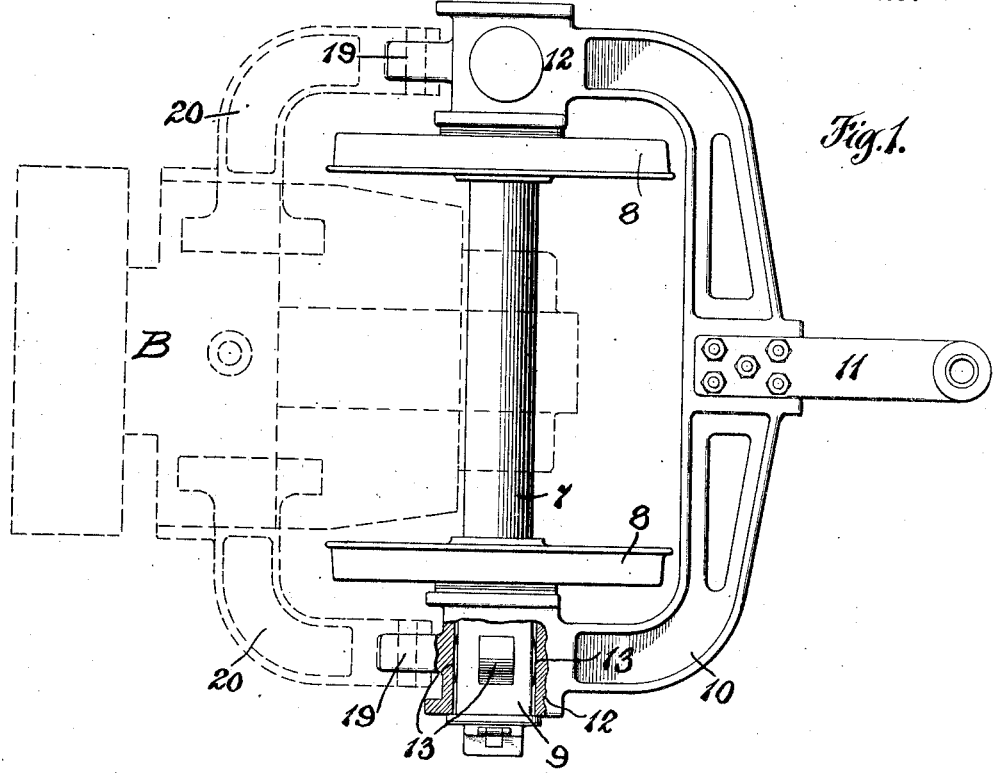
Fig. 1 is a plan view of one form of truck embodying our invention, the application of a booster thereto being indicated in dotted lines and a portion thereof being broken away to illustrate a self-aligning journal box employed in connection with this improvement.
Figure 2:
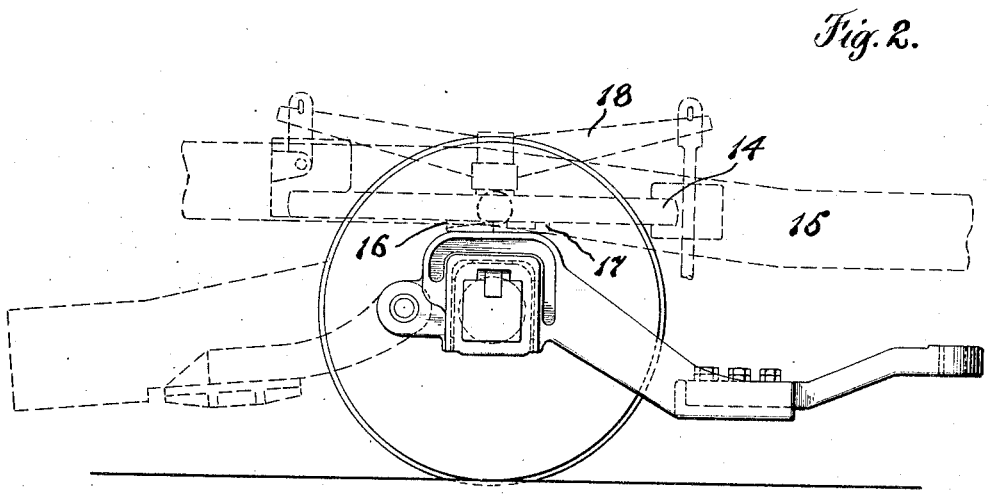
Fig. 2 is a side elevation of Fig. 1, with certain portions of the locomotive indicated in dotted lines.

Referring now to Figs. 1 and 2, the reference number 7 indicates the axle of the truck, which in this instance is of the trailing type. The axle is provided with wheels 8 and it is journaled in the boxes 9 which are mounted in the frame 10, as will further appear.

It will be seen that the frame 10 is an open frame, that is to say, it is open in the rear and not closed or tied in by a cross member, which, in customary practice, is made rigid with the frame. A radius bar 11 providing pivotal connection with the locomotive structure is bolted or otherwise secured to the frame 10. The saddles or pedestals 12 for the journal boxes 9 are preferably made integral with the frame.

It will be noted that this frame is of very light construction and the excessive weight of the standard form of truck is avoided. In order to avoid difficulties resulting from disalignment of the journal box bearings and the axle, such as running hot, rapid wear of the bearings, etc., we provide a means which will compensate for any springing of the frame which might take place under service conditions. As one means for maintaining proper alignment, we employ the journal boxes provided on the top and at the sides with curved or arcuate surfaces 13, which surfaces, in effect, constitute a ball connection with the saddle, permitting the boxes to self align themselves with the axle, in addition to which it will be seen that pedestal wear is greatly reduced.

As thus far described the truck may be used as a simple truck which is standard and interchangeable with other forms of trucks for similar use. In this connection, we have illustrated for purposes of illustration, in Fig. 2, a spring yoke 14 of usual construction and secured to the side frame 15 of the locomotive in a customary manner. By providing a slip connection below the spring yoke, the truck may be readily applied to existing locomotives. In the embodiment shown this slip connection consists of a pair of plates 16 and 17, disposed at a suitable angle with reference to the axis of rotation and permitting the truck to swing during curving without distorting the spring 18.

Coming now to those features of the truck which make it applicable for use as a booster-driven truck, it will be seen that we provide two rearwardly projecting lugs 19, such lugs being apertured so that a booster motor lateral supporting means may be articulated therewith. In this instance the means referred to comprises a pair of brackets 20, adapted to be suitably fastened or secured to the booster motor indicated as a whole by the reference letter B, such booster motor being suspended from the locomotive structure in any preferred manner, such as shown, for example, in our copending application above referred to. Thus the truck may swing with reference to the locomotive structure, and relative vertical movement between truck and locomotive may take place. The axle in such application is, of course, provided with the necessary gear for driving and the forward end of the booster motor is carried on the axle in a manner well understood in this art.

From the foregoing it will be seen that the frame, journal boxes and booster motor supports may be readily substituted for the ordinary truck construction of a booster-driven truck, or, on the other hand, that a booster motor may be readily applied to the truck, or interchanged with another booster. Also, as before pointed out, the open type of construction permits of the application of boosters to locomotives where, before, the space limitations were such as to prohibit such application, and in addition to which it will be seen that a maximum sized booster motor may be applied and that large clearances are provided for inspection, repair and replacement.

Referring now to Figs. 3 and 4, instead of providing an integral frame such as shown in Figs. 1 and 2, we form the saddles 12, lugs 19 and bracket-like supporting members 21 integral, the latter being connected and tied together by means of a triangular-shaped radius frame 22 (see Fig. 4). We thus have a truck, as before, capable of use as a simple truck.

To make a booster application of this truck, we remove the frame 22 and substitute therefor the brackets 21' which are bolted to the booster motor frame or bed plate and to the supports 21, the truck being swung around for such application. We then secure a radius bar member 23 to the lugs 19 by the pins 24. If desired the arrangement of Fig. 5 may be substituted for the frame 22 in making a booster application.

The truck when used in a booster application has all of the advantages pointed out in our aforesaid copending application.

What we claim is:

1. A radial truck for use in railway vehicles having an open frame adapted to be pivotally attached to the vehicle frame, and an axle journaled in said open frame.

2. A radial truck for use in railway vehicles having an open frame adapted to be pivotally attached to the vehicle frame, boxes in said open frame, and an axle journaled in said boxes, the boxes being supported for self-alignment.

3. A radial truck for use in railway vehicles having an open frame adapted to be pivotally attached to the vehicle frame, boxes in said open frame, and an axle journaled in said boxes, the boxes having means whereby the bearings will self-align with the axle.

4. A radial truck for use in railway vehicles having an open frame adapted to be pivotally attached to the vehicle frame, said open frame having pedestals integral therewith, boxes in the pedestals, and an axle journaled in the boxes.

5. A truck for railway vehicles having an axle and wheels, and an open frame in which the axle is journaled, said frame having means whereby a booster motor support may be articulated therewith.

6. A truck for railway vehicles having an axle and wheels, and an open frame in which the axle is journaled, said frame having a pair of apertured lugs for the articulation of a booster motor support.

7. A truck for railway vehicles having an axle and wheels, and an open frame in which the axle is journaled, said frame having means whereby a booster motor support may be articulated therewith at an end thereof.

8. A truck for railway vehicles having an axle and wheels, and an open frame in which the axle is journaled, said frame having means whereby another truck part may be articulated therewith.

9. A truck for railway vehicles having an axle and wheels and an open frame, said frame having means for supporting a booster motor.

10. A truck for railway vehicles having an axle and wheels and an open frame, said frame having means for supporting a booster motor, and with means for pivotal connection with the locomotive structure.

In testimony whereof, we have hereunto signed our names.

E. L. SCHELLENS.
J. S. COFFIN, Jr.